United States Patent [19]

Bulatovic et al.

[11] Patent Number: 5,693,692

[45] Date of Patent: *Dec. 2, 1997

[54] DEPRESSANT FOR FLOTATION SEPARATION OF POLYMETALLIC SULPHIDE ORES

[75] Inventors: Srdjan Bulatovic; Tim M. Jessup, both of Peterborough; James F. Jackson, Sudbury, all of Canada; Gordon Leighton, The Woodlands, Tex.

[73] Assignees: Huntsman Petrochemical Corp., Austin, Tex.; Falconbridge Limited, Toronto, Canada

[*] Notice: The term of this patent shall not extend beyond the expiration date of Pat. No. 5,049,612.

[21] Appl. No.: 240,599

[22] Filed: May 9, 1994

Related U.S. Application Data

[63] Continuation-in-part of Ser. No. 878,806, May 5, 1992, abandoned, which is a continuation of Ser. No. 424,195, Oct. 19, 1989, abandoned, which is a continuation-in-part of Ser. No. 188,949, May 2, 1988, Pat. No. 4,877,517.

[51] Int. Cl.$^6$ ............................. C08L 3/04; C08L 3/08
[52] U.S. Cl. ....................... 524/47; 524/50; 524/52; 525/54.26; 252/61
[58] Field of Search ......................... 229/166, 167; 252/61; 525/54.26, 54.42; 527/314, 400; 536/4.1; 524/47, 50, 52

[56] References Cited

U.S. PATENT DOCUMENTS

| | | | |
|---|---|---|---|
| 2,471,384 | 5/1949 | Booth | 209/167 |
| 2,813,093 | 12/1957 | Caldwell et al. | 536/50 |
| 2,842,541 | 7/1958 | Journeay | 536/50 |
| 2,894,944 | 7/1959 | Paschall | 536/50 |
| 2,917,506 | 12/1959 | Caldwell et al. | 536/50 |
| 2,970,140 | 1/1961 | Hullinger et al. | 536/50 |
| 3,640,826 | 2/1972 | Lang | 252/8.51 |
| 3,668,123 | 6/1972 | Steinberg et al. | 530/500 |
| 3,697,498 | 10/1972 | Browning et al. | 530/501 |
| 3,770,472 | 11/1973 | Jarowenko | 536/47 |
| 3,860,414 | 1/1975 | Lang | 75/321 |
| 3,912,623 | 10/1975 | Buzn | 209/167 |
| 3,988,246 | 10/1976 | Hartfiel | 175/65 |
| 4,061,611 | 12/1977 | Glowaky et al. | 524/50 |
| 4,339,331 | 7/1982 | Lim | 209/167 |
| 4,554,307 | 11/1985 | Farrar et al. | 524/445 |
| 4,759,802 | 7/1988 | Ochi et al. | 524/2 |
| 4,871,825 | 10/1989 | Lin | 75/326 |
| 4,877,517 | 10/1989 | Bulatovic et al. | 209/167 |
| 4,891,415 | 1/1990 | Lin | 527/400 |
| 4,952,329 | 8/1990 | Bulatovic et al. | 209/167 |
| 4,977,211 | 12/1990 | Doi | 525/54.26 |
| 5,049,612 | 9/1991 | Bulatovic et al. | 525/54.26 |

FOREIGN PATENT DOCUMENTS

| | | |
|---|---|---|
| 0888190 | 12/1971 | Canada . |
| 216091 | 8/1985 | European Pat. Off. . |
| 25866 | 2/1977 | Japan . |
| 2075526 | 4/1981 | United Kingdom . |

OTHER PUBLICATIONS

Nikitin "The Chemistry of Cellulose and Wood", pp. 62–71, Israel (1966).

*Primary Examiner*—Jeffrey C. Mullis
*Attorney, Agent, or Firm*—Russell R. Stolle; Ron D. Brown; David L. Mossman

[57] ABSTRACT

A new depressant for use in enhanced separation of polymetallic sulphides is described. The depressant agent is used in conjunction with conventional collector agents and frothing agents in the flotation separation of copper, nickel, lead, zinc sulphides by depressing iron sulphides such as pyrrhotite, pyrite and marcasite in the tailing. The depressant consists of a chemically-modified carbohydrate polymer, a polyacrylate and low foaming lignin sulphonate.

9 Claims, 3 Drawing Sheets

DEPRESSANT FOR FLOTATION SEPARATION OF POLYMETALLIC SULPHIDE ORES

This is a continuation-in-part of application Ser. No. 07/878,806 filed on May 5, 1992, now abandoned which is a continuation of application Ser. No. 07/424,195 filed on Oct. 19, 1989, abandoned, which is a continuation-in-part of application Ser. No. 07/188,949 filed on May 2, 1988, now U.S. Pat. No. 4,877,517.

FIELD OF INVENTION

This invention relates to mineral separation of valuable metals by froth flotation. More specifically, this invention relates to mineral separation by froth flotation of valuable metal sulphides by the enhanced depression of iron sulphidic minerals.

BACKGROUND TO THE INVENTION

Froth flotation is a well known process for obtaining mineral concentrates, and thereby reducing the bulk that needs to be handled by the extractive process to obtain the refined, or purified compound or element. In the case of obtaining valuable metals, the ore containing the value metals is concentrated into an enriched mineral fraction by known methods, such as froth flotation. The concentrate of the metals, or compounds, obtained by flotation is usually still diluted by other substances. The concentrate is generally treated in subsequent process steps to further separate and purify the value metals contained in the ore. The term value metal is understood .by metallurgists and mineral processing engineers to refer to the particular metal or metals to be extracted from the ore or concentrate by the process under consideration.

Several of the known metals are present in their ores as sulphides and/or oxides. Value metals as sulphides in their ores are often very intimately mixed with iron sulphides. The iron sulphides are usually of little use to the metallurgist and in order to obtain refined and purified metals such as copper, nickel, zinc, lead and similar value metals, it is advantageous to separate the iron sulphides as much as possible from the sulphides of the value metals at the early stages of the metal winning process. Such a separating process is froth flotation, and in the case of iron and other sulphide containing ores, it is usual to float the value metals off and depress the bulk of the iron sulphides to be retained in the tailing.

An essential feature of the froth flotation process consists of grinding the crude or raw ore to the fineness at which most of the mineral particles are liberated. The degree of grinding is dictated by the economical considerations of the subsequent process steps. Grinding may be dry or may be conducted in an aqueous medium. The ground ore is made to form a pulp or slurry with water. This aqueous ore slurry is then subjected to froth flotation in the presence of collectors or collecting agents, depressing agents and frothing agents. Prior to adding these agents to the aqueous slurry it is often advisable to condition the surface of the ore particles to enable the adsorption of these agents. The conditioning agents may be pH modifiers, slime coagulants or other reagents which will enhance the effectiveness of the collectors and depressants.

The collecting agent usually makes the mineral substances which are to be concentrated hydrophobic, thereby allowing air bubbles to be attached to the surface of the particles in the flotation device for forming a froth. The froth is then collected, dried or dewatered to provide a concentrate of the requisite substance.

Complete selectivity with respect to the separation of the individual minerals is difficult to achieve and often impure concentrates are produced which are further refined using other processes in subsequent treatment steps.

It is known to add other chemical reagents to improve the selectivity of the collecting agent. Such reagents may be so-called depressing agents known to depress unwanted substances. Depressants affect the flotation process by rendering the unwanted mineral hydrophilic (i.e. water wettable), thus reducing the possibility of the unwanted mineral to be floated simultaneously with those substances which are to be concentrated in the froth.

Substances used as gangue depressants in flotation processes cover a large variety of both organic and inorganic chemicals and these are well documented in the literature.

The type of depressant used largely depends on the variety of mineral substances which accompany the value metals or compounds in the ore and which are to be separated by the mineral separation process. .The mineral substances in different raw ores differ widely in surface chemistry as well as in composition.

SUMMARY OF INVENTION

The present invention is directed to a novel composition of matter which is useful for the depression of iron sulphidic minerals, usually present is pyrrhotite, pyrite and marcasite, in a mineral flotation separation process of value metal sulphides.

The depressant is incorporated in the conventional sulphidic ore beneficiation process which comprises a grinding step followed by treatment with reagents such as pH modifiers, collectors and other depressants affecting other components of the sulphidic ore. The treatment with these reagents may be accomplished in several conditioning stages. The froth flotation separation may be conducted in a single stage or in several stages wherein the separated crude fraction (rougher concentrate) is cleaned several times after reconditioning with reagents.

In the case where magnetic pyrrhotite is present in the sulphidic ore, a magnetic separation stage may be incorporated in the mineral separation treatment. The final tailing obtained in a sulphidic ore flotation separation consists of pyrite, marcasite, pyrrhotite and other nonsulphidic gangue minerals.

In most of the known flotation separation processes for the treatment of sulphidic ores, the pyrrhotite rejection has been found to be poor. Some commercial operations for obtaining copper-nickel concentrates from sulphidic ores have shown a low degree of selectivity towards pyrrhotite and the obtained concentrates showed high pyrrhotite contamination, thereby substantially increasing the cost of obtaining refined metallic copper and nickel.

In using other conventional reagents for the separation of massive copper-nickel or copper-zinc sulphides also containing pyrrhotite, it was found that some of the copper, nickel and zinc were also depressed with the pyrrhotite, thereby substantial portions of the value metal were lost in the tailing Sulphidic ores containing copper-zinc and pyrrhotite, wherein pyrrhotite represents a large amount of mineral, have so far not been satisfactorily separated by conventional reagents.

The present invention is directed towards the provision of a new pyrrhotite depressant as well as pyrite and marcasite depressant for the effective separation of copper-nickel sulphides, copper-zinc sulphides and copper-lead-zinc sulphides from pyrrhotite, pyrite and marcasite contained in sulphidic ores by means of froth flotation.

Accordingly, in one aspect of the present invention, there is provided a novel composition of matter useful for the depression of iron sulphidic minerals in a mineral flotation separation process, which comprises a mixture of at least one chemically-modified carbohydrate polymer and at least one stabilizer for the carbohydrate polymer which is a polyacrylic acid or salt thereof having a viscosity average molecular weight from about 1,000 to about 10,000 and/or a low foaming lignin sulphonate.

GENERAL DESCRIPTION OF INVENTION

Figure 1:
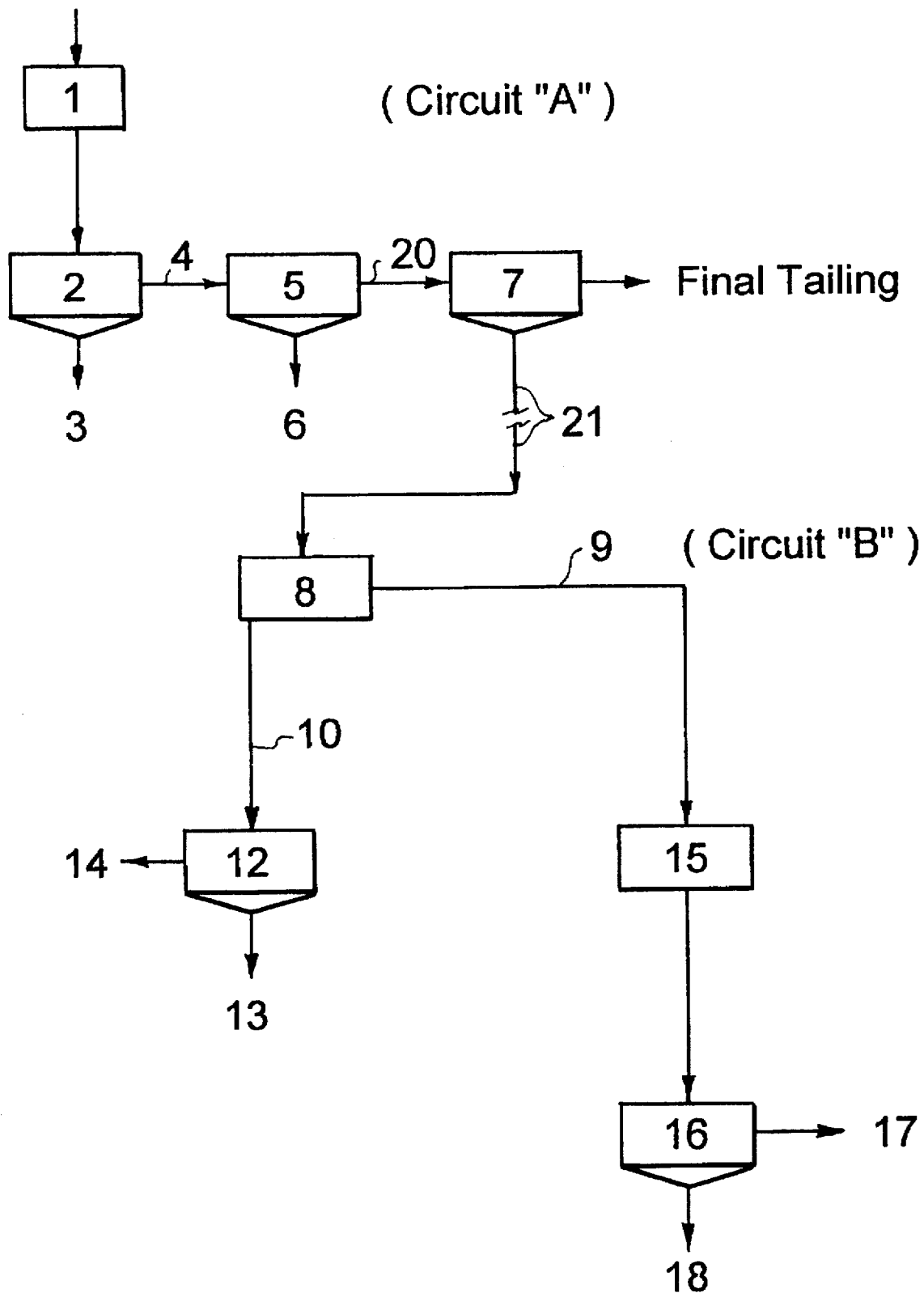
FIG. 1 is a schematic flowsheet of a commercial sulphidic ore beneficiation process incorporating the addition of the depressant of the present invention in one of the flotation separation steps.

One essential component of the composition of the invention is a chemically-modified carbohydrate polymer. Such carbohydrate polymers include starches, as well as hydrolics derivatives, such as dextrins.

One preferred embodiment of the iron sulphide mineral depressant is based on an amphoteric starch compound. It is known to classify starch compounds into these main groups, namely: cationic starch which will bond to anions, anionic starch which will bond to cations and amphoteric starch which will bond to both anions and cations. The preferred starch used in the preparation of the depressant is corn starch, but any starch compound which has similar properties can be substituted, such as potato starch and tapioca starch.

The carbohydrate first is causticized by treating the carbohydrate under alkaline conditions. The causticization may be effected by adding the carbohydrate to an alkaline solution, such as a solution containing sodium hydroxide, potassium hydroxide, or other alkali metals or water soluble alkaline earth metals.

The solution first has a milky appearance and is clear when the causticization is complete and the carbohydrate has gone into solution. The pH conditions required depend on the carbohydrate treated. For example, for an amphoteric starch, it is preferred to employ an aqueous medium having a pH of 12 to 14. Similarly, the reaction conditions employed depend on the carbohydrate treated. For example, causticization of starch is usually carried out in a hot solution, but this is not required for dextrin. A room temperature treatment is sufficient for dextrin.

The causticized carbohydrate then is chemically-modified with the addition of one of the following reagents, namely carbon disulphide, an ethyleneamine such as diethylenetriamine, or aminoacetonitrile bisulphate. The functional group of the latter compound is the $HSO_4^-$ radical.

The chemically-modified carbohydrate then is combined with at least one stabilizer for the carbohydrate. One such stabilizer in a polyacrylic acid or a salt thereof, preferably the sodium salt. Useful polyacrylic acids have a viscosity average molecular weight in the range of about 1,000 to about 10,000, preferably about 3,000 to 4,000.

Another such stabilizer is a low foaming lignin sulphonate. The lignin sulphonate may be employed as a salt thereof, preferably the sodium salt, although other water-soluble alkali metal or alkaline earth metal lignin sulphonates may be employed. One such low foaming lignin sulphonate is defined as containing less than 0.1% sugar. It is preferred to employ both the polyacrylic acid and the low foaming lignin sulphonate with the chemically-modified carbohydrate. As defined herein, the term lignin sulfonate includes, but is not limited to, polymerized lignin sulfonates.

The causticized, chemically-modified starch polymer and the starch polymer stabilizing agents are not reacted or polymerized together to make the subject composition of matter. Rather, the causticized, chemically-modified starch polymer and the starch polymer stabilizing agents are present as a blend or mixture, rather than as a reaction product. This is a distinction over the polymeric lignin sulphonate bearing cross-linked starch polyacrylate reagent described in U.S. Pat. No. 5,049,612.

The resulting composition has a depressing effect on pyrrhotite, pyrite and marcasite when added to aqueous slurries containing valuable polymetallic sulphides including iron sulphides, without altering the flotability of sulphidic value minerals such as chalcopyrite, sphalerite, pentlandite, galena, complex copper-nickel sulphides and similar value metal sulphides.

The depressant of this invention is referred to in the examples hereinafter as PK depressant. Depending on the type of the agent used for chemical treatment of carbohydrate and the ratios of other reactants to chemically-treated carbohydrates, the PK series of the present process extend from PKM to PK5.

EXAMPLES

The following Examples illustrate the preparation of the PK depressant and the effectiveness of the depressant when utilized in froth flotation.

Example 1

An amphoteric corn starch was slurried with water in the ratio of 2 parts starch to 1 part water and agitated until the starch has dissolved. The starch used in this example is available from Nacan Products Limited (a registered Canadian company) and is marketed under the tradename of Cato 1511.

Cato 1511 is a pearly white powder, with maximum moisture content of 15%. A 20% solids containing slurry in distilled water has a pH range of 3.2 to 4.2. Other characterizations of the starch are obtainable from the marketing company Nacan Products Limited. The general formula of the starch is given as $[C_6H_{10}O_5]_x$.

Chemical equivalents of this compound with similar characteristics may be substituted for Cato 1511 starch.

To the aqueous starch solution prepared as indicated above, sodium hydroxide was added in an amount that is half the weight of the starch, i.e. starch to sodium hydroxide was about 2±0.5:1±0.5 and the resulting mixture was agitated with heating at around 90° C. It is usual that the causticization of the starch by sodium hydroxide takes around 30–40 minutes, but this is a suggested reaction time only. The resulting aqueous solution was found to have a pH range of 12.5 to 13.5.

The causticized starch was subsequently reacted with one of the reagents: carbon disulphide, diethylenetriamine or aminoacetonitrile bisulphate. The reagent was slowly added with agitation. The reaction is usually complete, depending on the quantities used, in about one hour.

The chemically-treated starch paste was mixed in a subsequent step with a polyacrylic acid of low molecular weight. The optimum viscosity average molecular weight range was found to be 3000 to 4000. The polyacrylic acid of low molecular weight was added in a 25% (wt/wt) aqueous solution. Polyacrylic acid is commercially available from Allied Colloids Canada Incorporated under the tradename of Versicol E5. The most advantageous ratio of chemically-treated starch to polyacrylic acid was found to be 2:1. However, the ratio of chemically-modified starch to polyacrylic acid may vary from 5:1 to 1:1.

The chemical reagent, Versicol E5 may be substituted by other chemical equivalents., The third component of the novel pyrhhotite depressant which was sodium lignin sulphonate containing less than 0.1% sugar, was added as a dry powder to the aqueous suspension of the chemically-modified starch polyacrylate. The sugar-free sodium lignin sulphonate was added in an amount that was equal to the dry weight of the polyacrylic acid, or Versicol E5 referred to hereinabove. Thus, polyacrylic acid: sodium lignin sulphonate 1:1 in the resulting suspension. The aqueous suspension of chemically-modified starch polyacrylate was agitated until all the sodium lignin sulphonate had dissolved.

Table 1 lists the various pyrrhotite depressant agent compositions utilized in the froth flotation process. The compositions vary according to the chemical-modifying reagents and the ratio of the polyacrylic acid to the chemically-modified starch.

The following Examples illustrate the improvements in mineral separation of value metals from pyrrhotite, pyrite and marcasite obtained by the ultilization of the novel depressant in a conventional froth flotation process.

Example 2

A flotation separation test was carried out in the conventional manner on a copper-nickel ore from the Sudbury region (Canada), containing 16.8% pyrrhotite, 1.5% copper and 1.6% nickel. The ore was ground to a fineness of 55% passing 200 mesh Tyler sieve and slurried in water to yield pulp densities of 35% solids.

The following reagents were used:
Lime [$Ca(OH)_2$]=600 g/ton (to adjust pH to 9.0)—
Lime is a conventional conditioner,
Sodium Amyl Xantate=80 g/ton, conventional collector agent
DF250 (polyglycol)=15 g/ton frothing agent The above reagents were deployed in an existing commercial operation treating the ore from the example. The results obtained are tabulated in Table 2.

TABLE 2

| Product | Weight % | Assays, % | | | | % Distribution | | | |
|---|---|---|---|---|---|---|---|---|---|
| | | Cu | No | Pn* | Po** | Cu | Ni | Pn | Po |
| Bulk Cl.*** Conc. | 15.2 | 8.88 | 8.53 | 21.29 | 40.89 | 90.0 | 81.0 | 83.0 | 37.0 |
| Middlings | 3.8 | 1.97 | 0.84 | 2.05 | 48.63 | 5.0 | 2.0 | 2.0 | 11.0 |
| Bulk Ro. Conc. | 19.0 | 7.50 | 6.99 | 17.44 | 42.44 | 95.0 | 83.0 | 85.0 | 48.0 |
| Bulk Ro. Tail. | 81.0 | 0.09 | 0.33 | 0.72 | 10.70 | 5.0 | 17.0 | 15.0 | 52.0 |
| Feed | 100.0 | 1.5 | 1.60 | 3.9 | 16.8 | 100.0 | 100.0 | 100.0 | 100.0 |

*Pentlandite
**Pyrrhotite
***Cleaner

The selectivity between the copper-nickel bearing minerals and pyrrhotite was poor. About 48% of the total pyrrhotite in the ore was reported in the copper-nickel concentrate, and only 52% in the tailing.

Example 3

A mineral separation test was conducted on the same ore as in Example 2 using the same collecting and frothing agents as in Example 2 but omitting pH modifier and adding PKM depressant, the preparation and composition of which is provided in Example 1 above. The slurry was conditioned with depressant for 15 minutes before additions of collecting and frothing agents, then the slurry containing the reagents was subjected to rougher and cleaner flotation stages. The reagents used are shown below:
PKM=400 g/ton
Sodium Amyl Xanthate=80 g/ton, conventional collector agent

TABLE 1

| Depressant | Starch No. 1 | Starch No. 2 | Starch No. 3 | Poly Acrylic Acid(E5) | KELIG 100 | CATO 15 | Carbon di-Sulphide | Diethylene-tri-amine | Amino-acetonitrile bisulphate | MeOH | $H_2O$ |
|---|---|---|---|---|---|---|---|---|---|---|---|
| PKM | 15 g | — | — | 3 g | 3 g | — | — | — | — | — | 200 mL |
| PK-3 | — | 15 g | — | 3 g | 3 g | — | — | — | — | — | 200 mL |
| PK-4 | — | — | 15 g | 3 g | 3 g | — | — | — | — | — | 200 mL |
| Starch 1 | — | — | — | — | — | 100 g | 30 mL | — | — | 45 g | 560 mL |
| Starch 2 | — | — | — | — | — | 100 g | — | 30 mL | — | 45 g | 560 mL |
| Starch 3 | — | — | — | — | — | 100 g | — | — | 30 g | 45 g | 560 mL |

DF250=15 g/ton, conventional frothing agent

The results obtained with the use of PKM depressing agent are shown in Table 3.

TABLE 3

| Product | Weight % | Assays, % | | | | % Distribution | | | |
|---|---|---|---|---|---|---|---|---|---|
| | | Cu | Ni | Pn* | Po** | Cu | Ni | Pn | Po |
| Bulk Cl.*** Conc. | 9.02 | 15.23 | 14.65 | 36.80 | 26.63 | 91.0 | 81.1 | 83 | 14.3 |
| Middlings | 2.58 | 2.04 | 0.70 | 2.17 | 35.80 | 3.5 | 1.1 | 1.4 | 5.5 |
| Bulk Ro. Conc. | 11.60 | 12.3 | 11.55 | 29.1 | 28.67 | 94.5 | 82.2 | 84.4 | 18.8 |
| Bulk Ro. Tail. | 88.40 | 0.093 | 0.33 | 0.71 | 15.24 | 5.5 | 17.8 | 15.6 | 80.2 |
| Feed | 100.00 | 1.51 | 1.63 | 4.0 | 16.8 | 100.0 | 100.0 | 100.0 | 100.0 |

*Pentlandite
**Pyrrhotite
***Cleaner

Comparing the test results from Example 3 in which the depressant of the present invention was used with the results of Example 2 in which conventional reagents were used, it can be seen that when using PKM depressant over 80% of the pyrrhotite was rejected in the tailing. In the absence of the novel depressant PKM only 52% of the pyrrhotite was rejected in the final tailing.

Example 4

Another copper-nickel ore from the Sudbury (Canada) area was concentrated in a commercial plant using a schematic flowsheet which is shown in FIG. 1.

FIG. 1 shows two circuits, Circuit A and Circuit B of a commercial plant.

As shown, the ore is ground in a grinding plant (1). The sulphides, including pyrrhotites, were then treated in Circuit A and passed to the primary rougher flotation cell (2). The concentrate (4) is passed to a secondary flotation cell (5). The residues or tailings, (3) of the primary rougher cell (2) and that (6) of the secondary rougher flotation cell (5) are treated separately. The residue of flotation cell (5) is passed to a scavenger cell (7). The tailing of scavenger (7) is a final tailing and is hence discarded. The concentrate (21) obtained in scavenger (7) was subjected to magnetic separation of circuit B by first passing it through magnetic separator (8). The separated magnetic fraction (9) is reground (15) and is then passed to a magnetic rougher flotation cell (16) to separate the pentlandite from the pyrrhotite. In the conventional operation of Circuit B, large quantities of pyrrhotite were floated together with the pentlandite, providing unsatisfactory separation.

Using the commercially obtained magnetic stream (9) which is a high pyrrhotite containing product, laboratory tests were carried out with additions of PKM depressant. Table 3 compares the results obtained in the plant and the results obtained in the laboratory on slurry (9) of FIG. 1 using PKM depressant.

TABLE 4

| Test No. | Description | Product | Weight % | Assays, % | | | | % Distribution | | | |
|---|---|---|---|---|---|---|---|---|---|---|---|
| | | | | Cu | Ni | Pn* | Po** | Cu | Ni | Pn | Po |
| P | Typical Plant Results *** | Mag.Conc(18) | 19.60 | 0.64 | 1.94 | 3.83 | 86.8 | 72.2 | 38.2 | 55.4 | 21.5 |
| | | Mag.Tail(17) | 80.40 | 0.06 | 0.77 | 0.75 | 77.6 | 27.8 | 61.8 | 44.6 | 78.5 |
| | | Feed(Magnet) | 100.0 | 0.17 | 1.00 | 1.36 | 79.4 | 100.0 | 100.0 | 100.0 | 100.0 |
| FM28 | Simul. Plant Conditions + 450 g/t PKM | Mag Conc. | 8.8 | 1.58 | 5.30 | 13.4 | 69.3 | 72.7 | 41.0 | 70.1 | 10.1 |
| | | Mag Tail. | 91.2 | 0.06 | 0.75 | 0.6 | 88.3 | 27.8 | 59.0 | 29.9 | 91.2 |
| | | Feed(Magnet) | 100.0 | 0.19 | 1.17 | 1.7 | 86.5 | 100.0 | 100.0 | 100.0 | 100.0 |

*Pentlandite
**pyrrhotite
***obtained in magnetic rougher cell 16

As can be seen in Table 4, a substantial improvement in the magnetic concentrate grade was achieved with the use of PKM depressant in test FM28. It is clearly shown that over 90% of the pyrrhotite was rejected compared to 78.5% achieved in the commercial plant separation.

Example 5

Magnetic fraction (9) of the concentrate obtained in scavenger (7) using the same material as in Example 4 (i.e. Circuit B feed of FIG. 1), a series of tests was carried out using different levels of depressant PKM additions. The results from these tests are illustrated in Table 5.

TABLE 5

| Test No. | PKM Added g/t | Product | Weight % | Assays, % | | | | % Distribution | | | |
|---|---|---|---|---|---|---|---|---|---|---|---|
| | | | | Cu | Ni | Pn* | Po** | Cu | Ni | Pn | Po |
| FM34 | 0 | Mag Conc. | 58.0 | 0.32 | 1.45 | 2.40 | 87.7 | 79.7 | 61.2 | 89.4 | 62.5 |
| | | Mag Tail. | 42.0 | 0.06 | 0.61 | 0.4 | 72.6 | 20.3 | 38.8 | 10.6 | 37.5 |
| | | Feed(Magnetics) | 100.0 | 0.21 | 1.10 | 1.59 | 81.3 | 100.0 | 100.0 | 100.0 | 100.0 |
| FM33 | 250 | Mag Conc. | 23.2 | 0.59 | 2.16 | 4.5 | 84.0 | 71.9 | 43.5 | 68.9 | 18.2 |
| | | Mag Tail. | 76.8 | 0.07 | 0.71 | 0.5 | 81.6 | 28.1 | 52.1 | 27.8 | 74.3 |
| | | Feed(Magnetics) | 100.0 | 0.19 | 1.05 | 1.4 | 82.1 | 100.0 | 100.0 | 100.0 | 100.0 |
| FM32 | 450 | Mag Conc. | 8.0 | 1.63 | 4.73 | 11.9 | 62.4 | 70.2 | 36.3 | 66.2 | 4.2 |
| | | Mag Tail. | 92.0 | 0.06 | 0.72 | 0.5 | 82.4 | 29.8 | 63.7 | 33.8 | 93.8 |
| | | Feed(Magnetics) | 100.0 | 0.19 | 1.04 | 1.4 | 81.0 | 100.0 | 100.0 | 100.0 | 100.0 |
| MM31 | 800 | Mag Conc. | 2.7 | 3.73 | 8.96 | 24.1 | 28.0 | 51.1 | 23.2 | 45.0 | 1.2 |
| | | Mag Tail. | 97.3 | 0.10 | 0.83 | 0.8 | 83.0 | 48.9 | 76.8 | 55.0 | 98.8 |
| | | Feed(Magnetics) | 100.0 | 0.20 | 1.05 | 1.5 | 81.7 | 100.0 | 100.0 | 100.0 | 100.0 |

*Pentlandite
**Pyrrhotite

Results obtained are shown in Table 5, and these clearly demonstrate that the new depressant of this invention is a powerful pyrrhotite depressant and gives good separation at an economical rate of addition. The decision of what is the best rate of depressant addition rests with the users, and is decided upon considering the economics of the entire mineral separation process.

Example 6

A laboratory mineral separation test was conducted on a copper-nickel-pyrrhotite containing ore which is utilized in a conventional commercial operation. The reagent dosages, types of collecting and frothing agents, were the same as those in the commercial plant. In the test of Example 6 the commercial continuous circuit was simulated.

Table 6 shows reagent additions and metallurgical results obtained in the conventional commercial operation. Comparative locked cycle tests were conducted on the commercial plant pulp using PKM depressant. The result of these tests are tabulated in Table 7.

TABLE 6

Reagents: Lime $Ca(OH)_2$ = 600 g/ton (pH Modifier)
Copper Sulfate $CuSO_4 \times 5\ H_2O$ = 120 g/ton activator
Potassium Amyl Xanthate = 180 g/ton Cu-Ni collector
Dow 250 = 50 g/ton frothing agent Results:

| Test | Product | Weight % | Assays, % | | | | % Distribution | | | |
|---|---|---|---|---|---|---|---|---|---|---|
| | | | Cu | Ni | Pn* | Po** | Cu | Ni | Pn* | Po** |
| Typical | Cu-Ni Bulk Conc. | 20.3 | 3.67 | 5.94 | 15.5 | 51.2 | 84.6 | 86.2 | 92.0 | 41.2 |
| Plant | PyrrhotiteTail. | 17.3 | 0.45 | 0.75 | 0.63 | 81.8 | 8.8 | 9.3 | 3.2 | 56.1 |
| Results | Scav. Tail. | 63.7 | 0.09 | 0.10 | 0.26 | 1.06 | 6.6 | 4.5 | 4.8 | 2.7 |
| | Comb. Tail. | 81.0 | 0.17 | 0.24 | 0.29 | 18.3 | 15.4 | 13.8 | 8.0 | 58.8 |
| | Feed | 100.0 | 0.87 | 1.38 | 3.36 | 25.1 | 100.0 | 100.0 | 100.0 | 100.0 |

*Pentlandite
**Pyrrhotite

TABLE 7

Reagents: PKM = 450 g/ton pyrrhotite depressant
Potassium Amyl Xanthate = 60 g/ton Cu-Ni collector) conventional
Dow 250 = 15 g/ton frothing agent) reagents Results:

| Test | Product | Weight % | Assays, % | | | | % Distribution | | | |
|---|---|---|---|---|---|---|---|---|---|---|
| | | | Cu | Ni | Pn* | Po** | Cu | Ni | Pn* | Po** |
| Simula- | Cu-Ni Bulk Conc. | 12.20 | 6.64 | 10.19 | 27.47 | 36.17 | 92.81 | 84.0 | 92.4 | 17.2 |
| ted | Pyrrhotite Tail. | 28.91 | 0.08 | 0.65 | 0.50 | 74.0 | 2.67 | 12.79 | 4.3 | 81.5 |
| Plant | Scavenger Tail. | 58.89 | 0.068 | 0.081 | 0.20 | 0.38 | 4.52 | 3.21 | 3.3 | 1.3 |
| With | Comb. Tail. | 87.80 | 0.072 | 0.27 | 0.30 | 24.3 | 7.19 | 16.0 | 7.6 | 82.8 |
| PK Add. | Feed | 100.00 | 0.87 | 1.48 | 3.6 | 25.7 | 100.00 | 100.00 | 100.0 | 100.0 |

*Pentlandite
**Pyrrhotite

It can be seen that when using depressant PKM (results shown in Table 7) over 82% of pyrrhotite was rejected in the final tailing, compared to 58.8% pyrrhotite rejection. In addition 41.2% of the pyrrhotite was included in the copper-nickel concentrate, as shown in Table 6, when the same conditions were used but without additions of the depressant described and prepared according to the present invention.

Example 7

Figure 2:
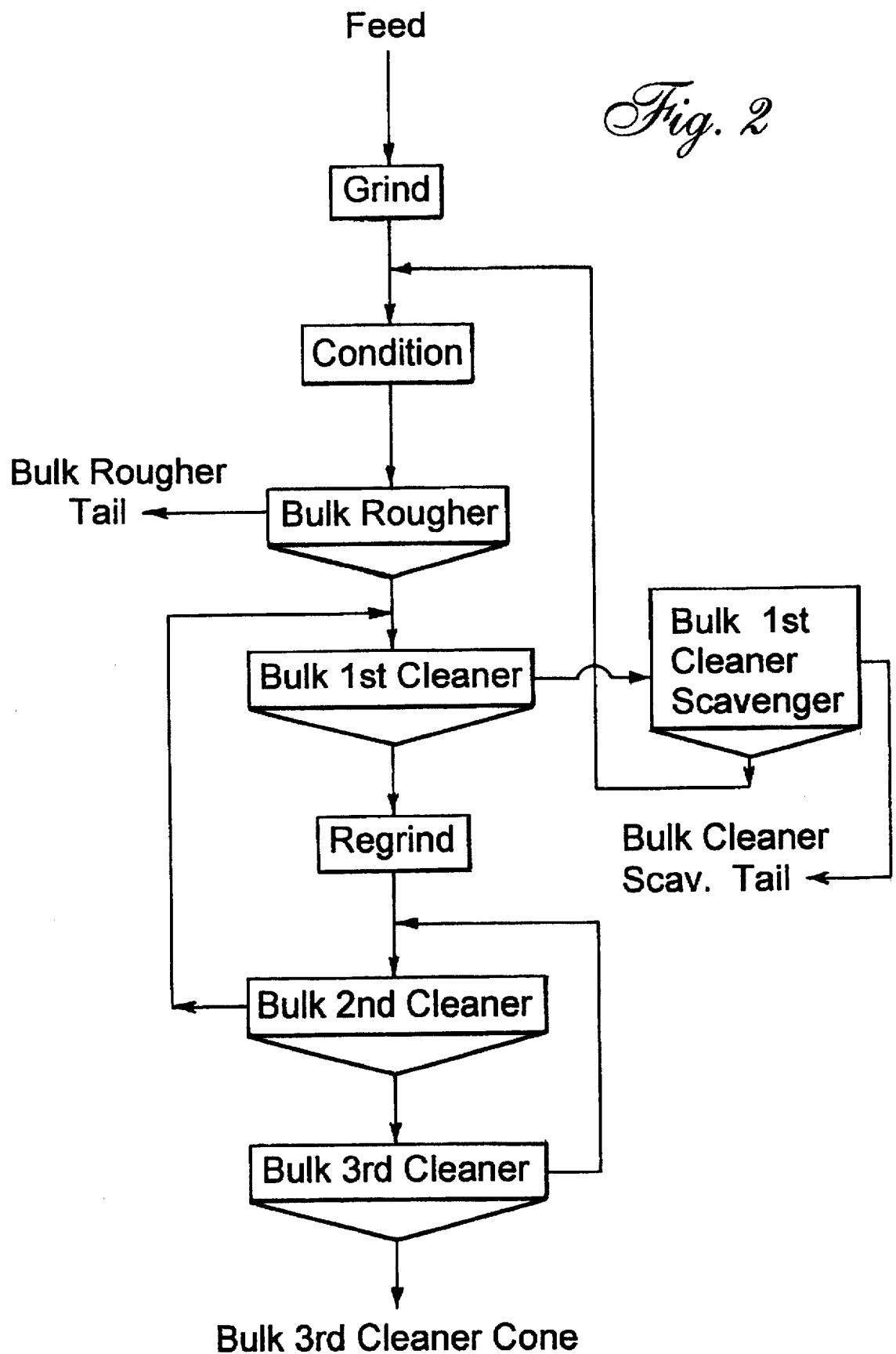
FIG. 2 is another flotation separation process step sequence utilizing the novel iron sulphide depressant.

A copper-nickel ore from British Columbia (Canada), containing large quantities of pyrite and pyrrhotite were treated in a laboratory continuous circuit, which was simulating a conventional commercial operation using treatment flowsheet shown schematically in FIG. 2. Comparative tests were run with and without additions of depressant PKM. The results of the comparative test indicating the effectiveness of PKM depressant of the present process, are shown in Table 8.

Significant improvement in the selectivity and in the rate of pyrrhotite-pyrite rejection were obtained with the use of Depressant PKM.

TABLE 9

Comparison of the Effect of PKD and PK3 Depressants.
a) Conditions

| | PK Reagent* | | | | | Collector | | Pine |
|---|---|---|---|---|---|---|---|---|
| Test No | Type | H.S. Cond. g/t | Ro. g/t | Sc g/t | Total g/t | A317 g/t | JPM 745 g/t | Oil g/t |
| T63 | PKD | 300 | 50 | 100 | 450 | 15 | — | — |
| T64 | PKD | 400 | 50 | 40 | 490 | 12 | — | — |
| T65 | PKD | 500 | 50 | 40 | 590 | 12 | — | — |
| T66 | PK3 | 300 | 50 | 40 | 390 | 12 | — | — |
| T67 | PK3 | 400 | 50 | 40 | 490 | 12 | — | — |
| T68 | PK3 | 500 | 50 | 40 | 590 | 12 | — | — |
| T71 | — | — | — | — | — | 2 | — | — |

*Conditioning time = 20 Minutes

Although the present invention has been described with reference to the preferred embodiment, it is to be understood that modifications and variations may be resorted to without departing from the spirit and scope of the invention, as those skilled in the art will readily understand. Such modifications

TABLE 8

Conditions Test 51: $Na_2CO_3$ = 2000 g/ton (pH Modifier)
  Sodium Amyl Xanthate = 60 g/ton collector agent
  Pine Oil = 200 g/ton frothing agent
Conditions Test 52: $Na_2CO_3$ = 1500 g/ton (pH Modifier) - Conditioner
  Sodium Amyl Xanthate = 60 g/ton collector agent
  Pine Oil = 20 g/ton frothing agent
  PKM = 250 g/ton depressant

| Test No. | Product | Weight % | Assays %, g/ton | | | | % Distribution | | | |
|---|---|---|---|---|---|---|---|---|---|---|
| | | | Cu | Ni | Pt | Pd | Cu | Ni | Pt | Pd |
| 51 | Cu-Ni Bulk Cl* Conc | 16.47 | 5.00 | 3.37 | 5.74 | 3.82 | 94.9 | 85.3 | 79.8 | 81.0 |
| | Cu-Ni Bulk Tail | 83.53 | 0.053 | 0.11 | 0.28 | 0.17 | 5.1 | 14.7 | 20.2 | 19.0 |
| | Head (Calc.) | 100.00 | 0.87 | 0.65 | 1.18 | 0.76 | 100.0 | 100.0 | 100.0 | 100.0 |
| 52 | Cu-Ni Bulk Cl* Conc | 8.26 | 10.26 | 5.69 | 9.47 | 7.01 | 94.1 | 76.8 | 68.3 | 70.6 |
| | Cu-Ni Bulk Cl* Tail | 91.74 | 0.058 | 0.16 | 0.39 | 0.26 | 5.9 | 23.2 | 31.7 | 29.4 |
| | Head (Calc.) | 100.00 | 0.90 | 0.61 | 1.15 | 0.82 | 100.0 | 100.0 | 100.0 | 100.0 |

*Cleaner

As shown, with the additions of PKM depressant in test 52, the grade of the bulk concentrate was much higher than that obtained in test 51 without PK depressant additions.

Example 8

Figure 3:
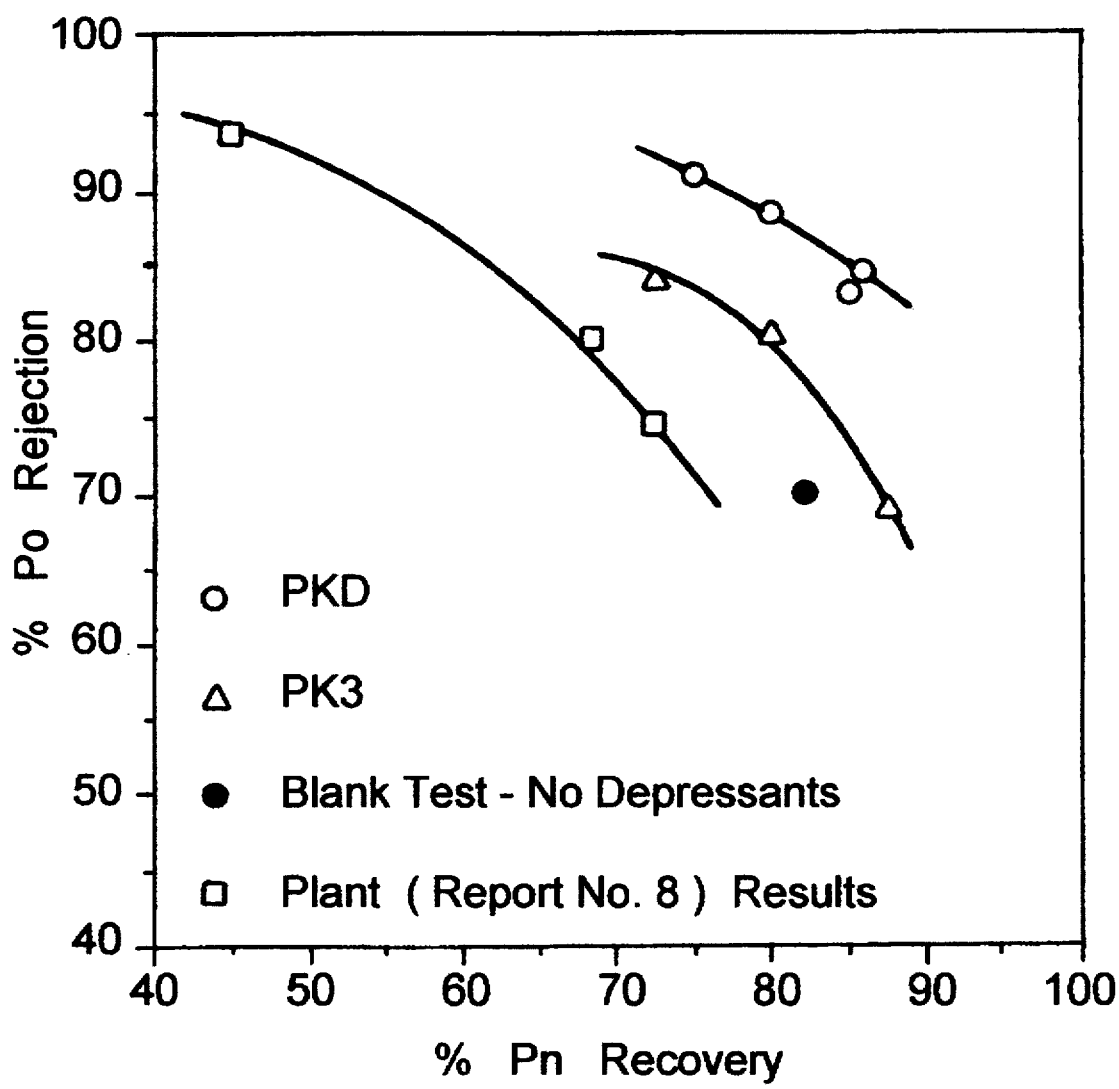
FIG. 3 is a graphical representation of certain experimental results described in the Example below.

A depressant was prepared following the procedure outlined in Example 1 utilizing a dextrin in place of the starch. The depressant action of this product (identified as PKD) was tested as generally described in the foregoing Examples and compared with the depressant action of the product PK3 referred to above. The results obtained are presented graphically in FIG. 3, from which it will be seen the that the PKD product was more effective as a depressant than PK3, under the conditions of testing.

In the following Table 9, the conditions of testing (a) and the results obtained (b) in the comparative tests are set forth:

and variations are considered to be within the purview and scope of the invention and the appended claims.

What we claim is:

1. An ore slurry comprising
   ground ore;
   water;
   a collecting agent; and
   a depressant composition of matter useful for the depression of iron sulphide minerals in a mineral flotation separation process, which depressant composition comprises a mixture of:
   a causticized chemically-modified starch polymer, where said causticized, chemically-modified starch polymer is formed by
      adding the starch polymer to an alkaline solution to produce a causticized starch polymer, and
      subsequently reacting the causticized starch polymer with a reagent selected from the group consisting of carbon disulphide, aminoacetonitrile bisulphate, an ethylene amine and a nitrile, and
   a starch polymer stabilizing agent where the starch polymer stabilizing agent consists of a starch polymer stabilizing agent selected from the group consisting of (a) a polyacrylic acid or salt thereof having a viscosity average molecular weight of about 1,000 to about 10,000 and (b) a lignosulfonate containing less than 0.1% sugar and (c) mixtures thereof.

2. The ore slurry of claim 1 where in the depressant composition both said polyacrylic acid or salt thereof and said low foaming lignin sulfonate are present.

3. The ore slurry of claim 2 where in the depressant composition said polyacrylic acid is present as the sodium salt thereof.

4. The ore slurry of claim 2 where in the depressant composition said polyacrylic acid has a viscosity average molecular weight of about 3,000 to about 4,000.

5. The ore slurry of claim 2 where in the depressant composition said carbohydrate polymer has been causticized by providing the same in aqueous alkaline solution.

6. An ore slurry comprising ground ore;

water;

a collecting agent; and a depressant composition of matter useful for the depression of iron sulphide minerals in a mineral flotation separation process, which depressant composition comprises a mixture of:

a causticized chemically-modified starch polymer, where said causticized, chemically-modified starch polymer is formed by adding the starch polymer to an alkaline solution to produce a causticized starch polymer, and subsequently reacting the causticized starch polymer with a reagent selected from the group consisting of carbon disulphide, aminoacetonitrile bisulphate, an ethylene amine and a nitrile, and wherein said starch polymer has been causticized by providing the same in aqueous alkaline solution, and starch polymer stabilizing agents consisting essentially of both (a) a polyacrylic acid or salt thereof having a viscosity average molecular weight of about 1,000 to about 10,000 and (b) a lignosulfonate containing less than 0.1% sugar.

7. The ore slurry of claim 2 where in the depressant composition said carbohydrate polymer is a dextrin.

8. An ore slurry comprising ground ore;

water;

a collecting agent; and a depressant composition of matter useful for the depression of iron sulphide minerals in a mineral flotation separation process, which depressant composition comprises a mixture of:

a causticized chemically-modified starch polymer, where said causticized, chemically-modified starch polymer is formed by adding the starch polymer to an alkaline solution to produce a causticized starch polymer, and subsequently reacting the causticized starch polymer with an ethylene amine containing diethylenetriamine, and starch polymer stabilizing agents consisting essentially of (a) a polyacrylic acid or salt thereof having a viscosity average molecular weight of about 1,000 to about 10,000 and (b) a lignosulfonate containing less than 0.1% sugar.

9. An ore slurry comprising ground ore;

water;

a collecting agent; and a depressant composition of matter useful for the depression of iron sulphide minerals in a mineral flotation separation process, which depressant composition comprises a mixture of:

a causticized chemically-modified starch polymer, where said causticized, chemically-modified starch polymer is formed by adding the starch polymer to an alkaline solution to produce a causticized starch polymer, and subsequently reacting the causticized starch polymer with a nitrite containing thioureanitrite, and starch polymer stabilizing agents consisting essentially of both (a) a polyacrylic acid or salt thereof having a viscosity average molecular weight of about 1,000 to about 10,000 and (b) a lignosulfonate containing less than 0.1% sugar.

* * * * *